US007792708B2

(12) United States Patent
Alva

(10) Patent No.: US 7,792,708 B2
(45) Date of Patent: Sep. 7, 2010

(54) DIGITAL FRAME HAVING WIRELESS COMMUNICATION CAPABILITY

(75) Inventor: Jessi Alva, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 12/175,421

(22) Filed: Jul. 17, 2008

(65) Prior Publication Data

US 2010/0017301 A1  Jan. 21, 2010

(51) Int. Cl.
*G06Q 30/00* (2006.01)
*G06F 17/00* (2006.01)
(52) U.S. Cl. ......................................... 705/26; 715/210
(58) Field of Classification Search ................. 705/1, 705/26, 27
See application file for complete search history.

(56) References Cited

U.S. PATENT DOCUMENTS

| | | | | |
|---|---|---|---|---|
| 6,442,573 | B1* | 8/2002 | Schiller et al. | 715/210 |
| 7,107,605 | B2* | 9/2006 | Janik | 725/51 |
| 7,224,777 | B1* | 5/2007 | Tannenbaum | 379/88.23 |
| 2008/0040233 | A1* | 2/2008 | Wildman et al. | 705/26 |
| 2008/0143890 | A1* | 6/2008 | Rosencwaig et al. | 348/836 |
| 2008/0195962 | A1* | 8/2008 | Lin et al. | 715/771 |

OTHER PUBLICATIONS

The website http://windowsitpro.com dated Nov. 29, 2007 and retrieved on Jul. 29, 2009.*
The website www.ceiva.com as archived by www.archive.org on May 5, 2006.*
Parrot Quick Start Guide, http://gullfoss2.fcc.gov/oetcf/eas/reports/ViewExhibitReport.cfm?mode=Exhibits&RequestTimeout=500&calledFromFrame=N&application_id=640077&fcc_id='RKXAP [accessed from Federal Communications Commission website on May 10, 2008], 40 pages.
Products Parrot, Parrot DF7700, Copyright 2007 Parrot S.A., http://www.parrot.com/usa/products/digitalphotoframes/parrotdf7700 [accessed on May 10, 2008], 3 pages.

* cited by examiner

*Primary Examiner*—Jason B Dunham
*Assistant Examiner*—Courtney Stopp
(74) *Attorney, Agent, or Firm*—Perkins Coie LLP

(57) ABSTRACT

A digital frame that may be removed from its packaging, powered on, and automatically begin receiving content from remote sources via a wireless telecommunications network. The digital frame includes a communications card to enable the digital frame to receive content over a wireless telecommunications network operated by one or more telecommunications service providers. The digital frame has an associated frame address so that users may send content, such as text, images or video, directly to the frame via the telecommunications network. The address may be an SMS/MMS address, an ftp site, an email address, a website address or another type of frame address to which the purchaser or others can send content for eventual delivery to the digital frame. The purchaser is typically charged for telecommunication services provided to the digital frame.

24 Claims, 10 Drawing Sheets

| Frame Identifier | Frame Address | Nickname | Frame Model | Plan Type | Purchaser's Account Number |
|---|---|---|---|---|---|
| 123456 | 123456@mms.domain.com | Mom | A | PP: 3 months Unlimited | 11111 |
| 234567 | 234567@mms.domain.com | Grandma Wilson | A | PP: 100 MB Data | 22222 |
| 345678 | 345678@mms.domain.com | Grace | B | MRC: Unlimited | 33333 |
| 456789 | 456789@mms.domain.com | *Unassigned* | B | MRC: 100 MB/Month | 44444 |
| 567890 | 567890@mms.domain.com | Henry | C | MRC: 50 MB/Month | 55555 |

*FIG. 6*

DIGITAL FRAME HAVING WIRELESS COMMUNICATION CAPABILITY

BACKGROUND

Digital frames typically display digital photos that are uploaded by a user via a memory card, phone line, Universal Serial Bus (USB) connection, or other direct upload methods. Alternatively, some digital frames download photos over a Wi-Fi or other local area network. One drawback to these methods of transferring digital photos to a digital frame is that they require the end user to have basic technological expertise in order to load the digital photos onto the digital frame. For example, to load pictures from a memory card or home computer, the user typically must know how to navigate the file system containing the photo files. As another example, to load pictures over a local Wi-Fi network, a user must first setup and maintain a wireless network and then manually configure the settings of the digital frame so that it can connect to the wireless network. Another drawback to existing methods of transferring digital photos to digital frames is that certain methods that provide for a semi-automated download from a remote source to a picture frame typically update the contents of the frame only intermittently. The intermittent upload to the frame may result in a significant lag between when the user first uploads the photo to a remote location (e.g., to a photo-hosting website) and when the frame first displays that photo. Accordingly, the need exists for digital frames and associated deployment and installation methods that overcome the above limitations, in addition to providing other benefits.

BRIEF DESCRIPTION OF THE DRAWINGS

FIG. 6 is a representative data table that stores frame identifiers and other data pertaining to digital frames.

DETAILED DESCRIPTION

Figure 1:
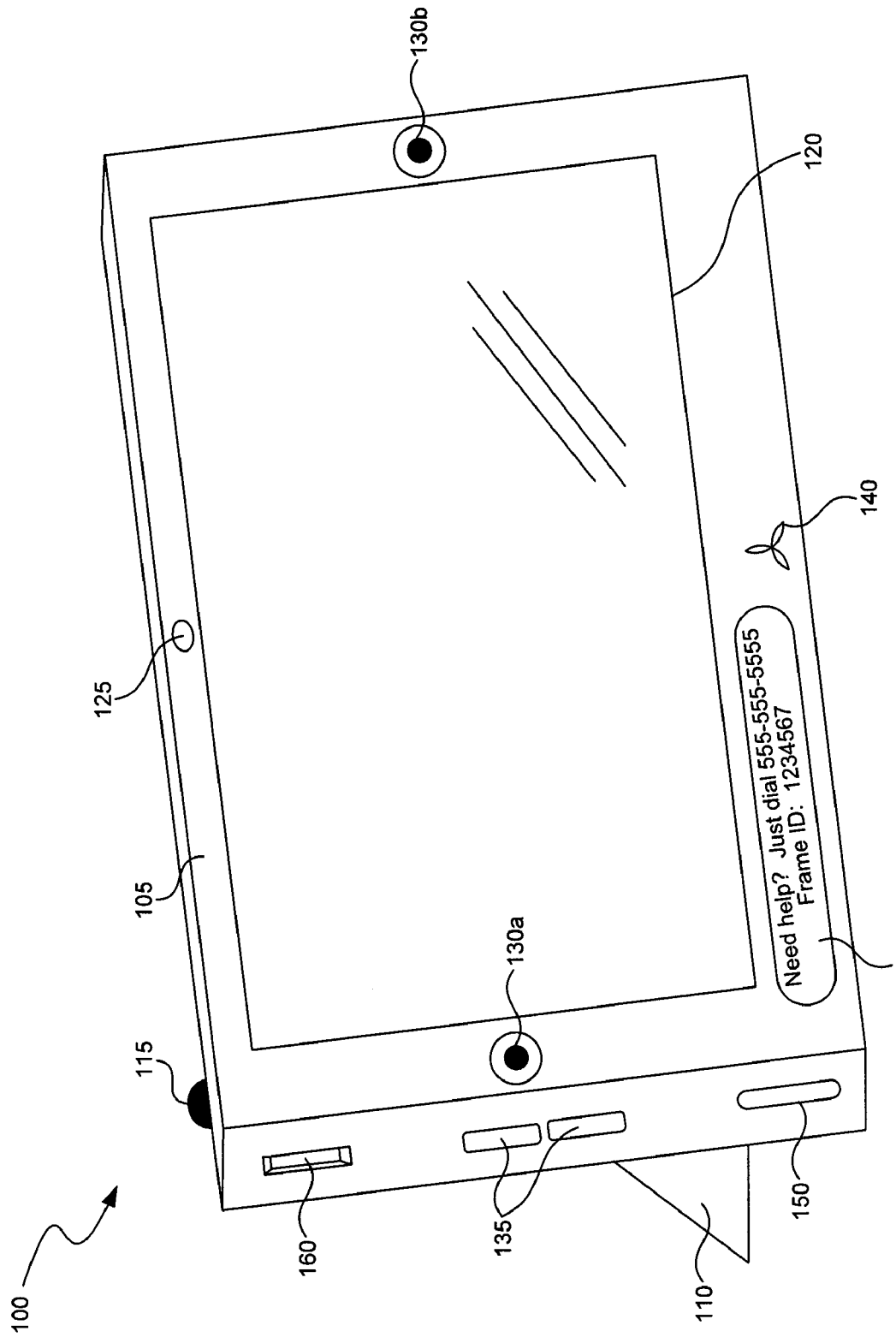
FIG. 1 is an isometric view of a digital frame.

A digital frame that may be removed from its packaging, powered on, and automatically begin receiving content from remote sources via a wireless telecommunications network is disclosed. The digital frame includes a communications card to enable the digital frame to receive content over a wireless telecommunications network operated by one or more telecommunications service providers. The digital frame has an associated frame address so that users may send content, such as text, images or video, directly to the frame via the telecommunications network. The address may be an SMS/MMS address, an ftp site, an email address, a website address or another type of frame address to which the purchaser or others can send content for eventual delivery to the digital frame. The use of a wireless telecommunications network for data transfer may significantly reduce or eliminate the lag between when the user sends content to the associated frame address and when the digital frame first displays that content. The purchaser is typically charged for telecommunication services that allow the wireless transmission of content to the digital frame.

In some embodiments, the frame address associated with the digital frame may be communicated to a purchaser of the frame in an automated fashion. For example, the frame address may be communicated via an electronic message (e.g., an e-mail or SMS) sent to the purchaser after purchase. By sending the frame address to the purchaser after purchase, the purchaser may immediately begin sending content to the frame or may easily share the frame address with other parties to allow other parties to send content to the frame.

After purchasing the digital frame, the purchaser may keep the frame for his or her own use or may give it to another user who may not have an account with the telecommunications service provider. In either case, the end user (whether purchaser or other user) may simply remove the frame from its packaging, plug the frame into an outlet, and turn the frame on at an installation location. Messaging upon the frame, its packaging, and accompanying materials facilitates the simple installation. A product demonstration may be displayed upon the digital frame upon installation.

In some embodiments, customer service may be provided to the end user by the telecommunications service provider or its affiliates. Messaging upon the frame makes it easier for the end user to request customer support, even if the end user does not have an account with the telecommunications service provider. In the event that the purchaser's account expires, the telecommunications service provider may use the telecommunications network to send a notice of account expiry to the end user. The notice may encourage the end user to contact the telecommunications service provider to establish a new account in his/her own name, or to link their existing account to the digital frame.

It will be appreciated that the disclosed methods and devices allow a telecommunications service provider to deploy a digital frame to a display location, receive content for the digital frame, transmit content to the digital frame, reliably bill for data transfer to the digital frame, and provide customer support to an end user of the digital frame.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 is an isometric view of a digital frame 100. The digital frame 100 includes a frame 105 and is supported by a stand 110 or by a hanger that allows the digital frame 100 to be attached to a surface (e.g., a wall). As will be described in additional detail herein, the frame includes communication components that enable the frame to communicate with a service provider via a wireless telecommunication network. An antenna 115 that is attached to the frame or embodied within the frame enables such a wireless connection. In some embodiments, the digital frame 100 also includes components (not shown in FIG. 1) that enable a wired connection to a telecommunications network (e.g., an RJ-11 port, an Ethernet port, a cable modem port, or other wired port). The digital frame 100 also includes at least one display region 120 to display content to a viewer. A display region may be constructed using an individual display panel, such as a liquid crystal display (LCD), an Organic Light-Emitting Diode (OLED) display, a Liquid Crystal On Silicon (LCOS) display, etc.

The digital frame 100 may also include audio output components such as speakers 130 (shown individually as speakers 130a and 130b). The speakers may be left and right speakers configured to produce stereo sound. The user may adjust the volume of the speakers by utilizing up and down volume buttons 135. The digital frame 100 may also include an audio input component such as a microphone 140 that is configured to receive sound. The digital frame 100 may also include a camera 125 that may capture still or moving images.

The digital frame 100 includes communication components and/or circuits that enable the frame to communicate by transmitting and receiving wireless signals using licensed, semi-licensed or unlicensed spectrum over a telecommunications network. Telecommunications networks include third-party telecommunications networks such as a Global System for Mobile (GSM) mobile telecommunications network, a code/time division multiple access (CDMA/TDMA) mobile telecommunications network, a 3rd Generation (3G) mobile telecommunications network (e.g. General Packet Radio Service (GPRS/EGPRS), Enhanced Data rates for GSM Evolution (EDGE), or Universal Mobile Telecommunications System (UMTS)), or other telecommunications network. Depending on the telecommunications network used for communication by the digital frame, the frame may include specific components that enable it to be identified on the telecommunications network. For example, if the digital frame 100 is configured to communicate over a GSM mobile telecommunications network, the digital frame 100 may include an embedded communications card 150, such as a Subscriber Identity Module (SIM) card, that stores an International Mobile Subscriber Identity (IMSI) number that can be used to identify the digital frame 100 on the GSM mobile telecommunications network. Alternatively, the digital frame 100 might have a communications card interface 160 for receiving a communications card (e.g., a SIM card) from a purchaser, user or seller of the digital frame 100. Telecommunications networks also include local or home-based telecommunications networks, such as telecommunications networks using Generic Access Network (GAN) or Unlicensed/Universal Mobile Access (UMA) standards and protocols. In some embodiments, the digital frame 100 includes components that enable it to connect to a telecommunications network using the aforementioned GAN or UMA standards and protocols. For example, the digital frame 100 may include components that support Internet Protocol (IP)-based communication over a Wireless Local Area Network (WLAN) and components that enable communication with the telecommunications network over the IP-based WLAN.

The digital frame 100 incorporates a frame identifier that uniquely identifies it to the telecommunications network. Example frame identifiers include a telephone number, an IMSI, an e-mail address, an IP address, a Media Access Control (MAC) address, or other identifier. The frame identifier allows digital content to be routed to the digital frame once the frame has established communication with a service provider through the telecommunications network and has provided the frame identifier to the service provider. Permanent or temporary messaging 170 may be provided on the surface of the digital frame that lists the frame identifier (or another identifier, such as a service tag number). As will be described in further detail herein, the messaging may describe how the end user can access customer support services. For example, the messaging might read: "Dial 555-555-5555 for assistance. Frame ID: 1234567."

The sources of content may send content (e.g., still photos or images, video clips, text messages, interactive video games, metadata associated with any of the foregoing or other types of content) to a frame address associated with a digital frame. The content is transmitted over the telecommunications network to a transmission tower or other access point serving the digital frame, and then transmitted from the transmission tower/access point to the digital frame. The digital frame may store the content in a storage medium such as a hard disk, flash memory, memory card, etc., located in the frame, in an external device accessible via a WLAN, a network location or at a server location accessible via the Internet. Upon receiving the indicated content, the digital frame automatically displays the content in the display region 120. In some embodiments, each time that content is received by the digital frame, the frame automatically displays the new content. In this way, the content displayed in the display region 120 may be constantly refreshed. In some embodiments, the digital frame stores received content and successively displays the content on the display regions 120 (e.g., displays the stored content in slideshow fashion). It will be appreciated that one advantage of the digital frame 100 is that it enables a user to enjoy new content associated with one or more sources without having to initiate the uploading of the new content. The digital frame 100 can therefore be successfully utilized by users with little or no technical expertise.

Figure 2:
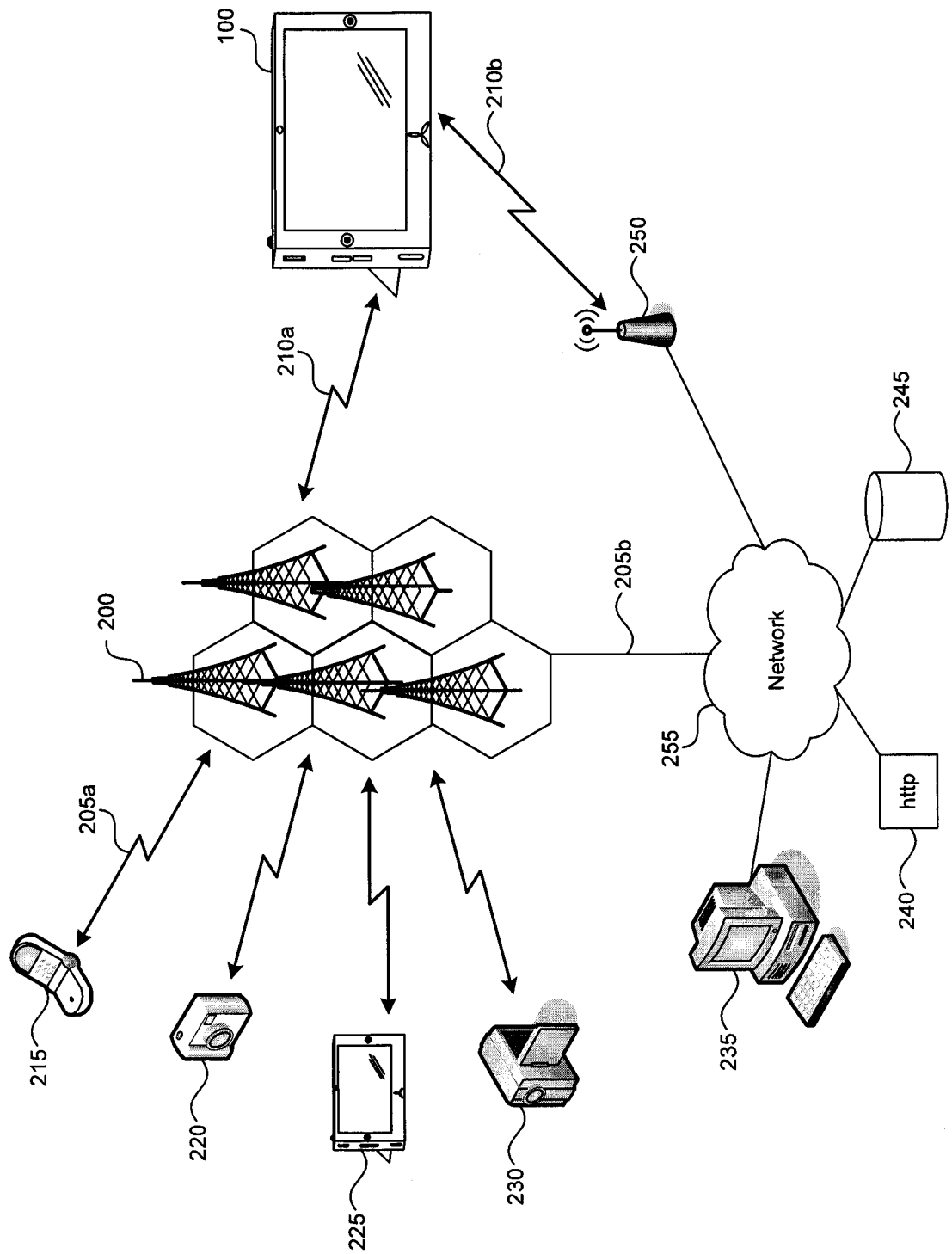
FIG. 2 is a block diagram illustrating a flow of content from various sources of content to a digital frame.

FIG. 2 illustrates a flow of content from various sources to the digital frame 100. Illustrated sources of content (i.e., content providers) include a mobile phone 215, a digital camera 220, another digital frame 225, a digital video camera 230, and a personal computer 235. Other types of sources may include websites 240 and online content repositories 245. The illustrated sources transmit content over a telecommunications network 200 and via a wireless signal 210a to the digital frame 100. The telecommunications network 200 may be owned or operated by one business entity or more than one business entity. For example, the network may include one or more sub-networks which are independently owned and operated by different telecommunications service providers but which offer leased capacity to a primary telecommunications service provider.

If a source is capable of sending content directly to the telecommunications network 200 (e.g., in the case of the mobile phone 215), the content can be sent via a wireless connection 205a. Alternatively, if the source is utilizing a device that is capable of sending content indirectly to the telecommunications network 200 (e.g., a device that connects indirectly to the telecommunications network via a private or public network 255, such as the Internet), the content may be sent over a wired (or wireless, or partially wired, partially wireless) connection 205b to the telecommunications network 200. For example, a personal computer 235 may connect over network 255 and upload content to a website. The website may provide the content or arrange to provide the content to the digital frame 100 directly via a wireless connection 210a or indirectly, such as by routing the content to an access point 250 serving the frame 100 via wireless connection 210b. The access point may be part of an IP-based telecommunications network, such as an Unlicensed Mobile Access (UMA) network. As another example, a digital camera 220 may wirelessly transmit content to the telecommunications network 200. In some embodiments, the digital frame 100 may transmit and/or receive content using methods described in PCT/US08/54793 (entitled DATA EXCHANGE INITIATED BY TAPPING DEVICES, filed Feb. 22, 2008), the entirety of which is hereby incorporated by reference. Those of skill in the art will understand that a source may be any of a variety of devices or applications that connect in a variety of ways to the telecommunications network 200, and that content from those sources may ultimately be conveyed to the digital frame 100.

Figure 3:
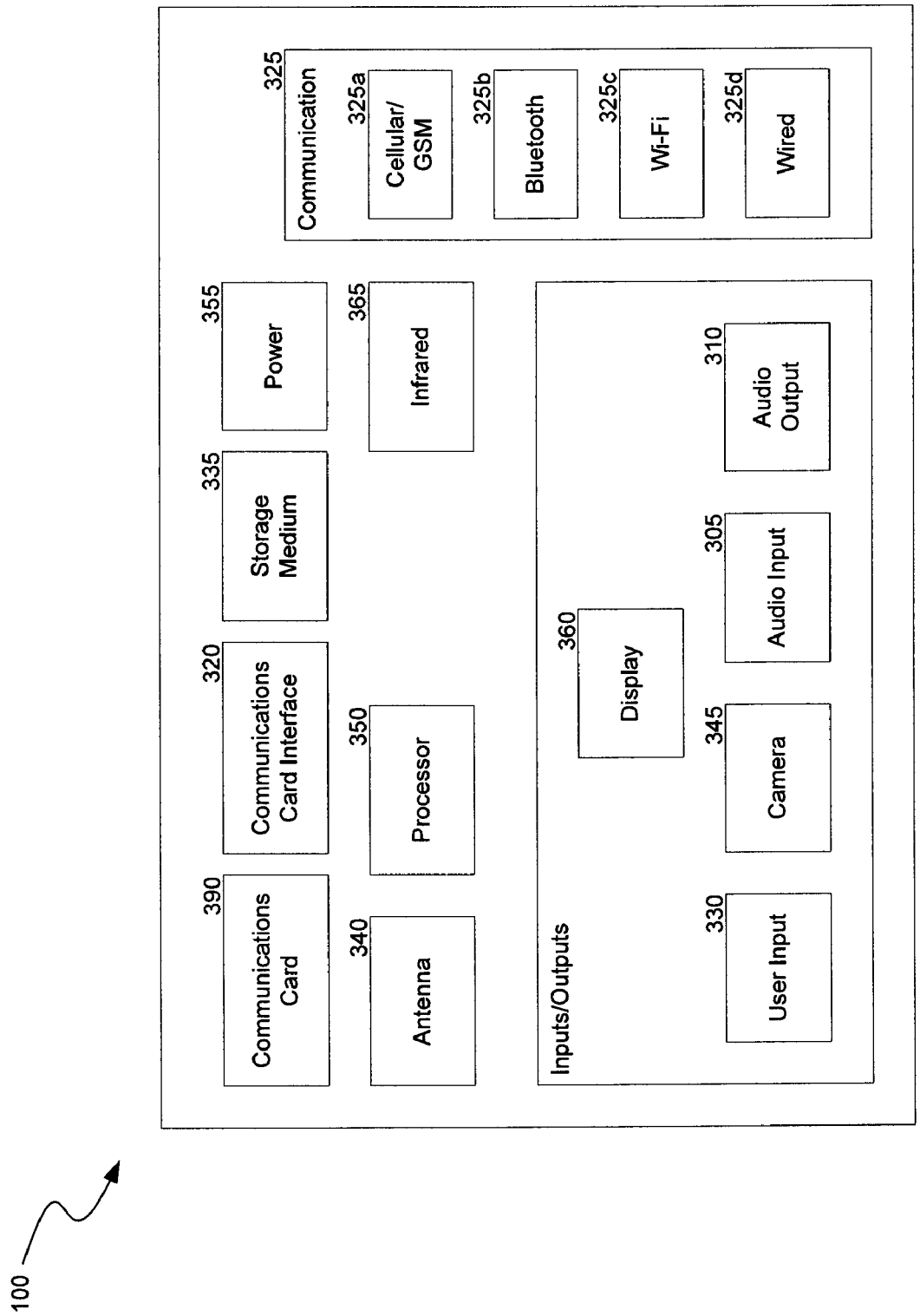
FIG. 3 is a block diagram of components of a digital frame.

FIG. 3 is a schematic view of components of the digital frame 100. The digital frame 100 includes various components that enable it to provide the functionality described herein. These components include an audio input component 305 (e.g., microphone) and an audio output component 310 (e.g., speakers). A user input component 330 (e.g., buttons, alpha-numerical keyboard, etc.) enables the user to interact with the digital frame 100 (e.g., adjust speaker volume, access stored content, adjust configuration settings, etc.). A camera component 345 (e.g., digital camera) captures images (e.g., still or moving images). A storage medium component 335 (e.g., hard drive, flash memory, memory card, etc.) stores content and other data (e.g., processing instructions, configuration settings, etc.). A processor 350 executes processing instructions. The digital frame 100 also includes a communications card interface 320, which enables the digital frame 100 to use a communications card 390 (e.g., SIM card) for the purpose of accessing a GSM/GPRS/EDGE/UMTS or other type of telecommunications network, and an antenna 340 for transmitting and receiving wireless signals. In some embodiments, the communications card 390 is permanently embedded in the digital frame; in other embodiments, the communications card 390 may be inserted into the communications card interface 320 at or after the time of sale. The digital frame 100 also includes a power source 355 (e.g., batteries, AC/DC converter, etc.), a communication component 325, which may include a GSM/GPRS/EDGE/UMTS component 325a, a Bluetooth component 325b, a Wi-Fi component 325c and/or a wired component 325d (e.g., RJ-11 port, Ethernet port, etc.). The Bluetooth component 325b and/or the Wi-Fi component 325c enable the digital frame 100 to transmit and receive wireless signals in the 2.4 GHz Industrial Scientific Medical (ISM) band. Other wireless protocols (e.g., Mobile Broadband Wireless Access (MBWA), Ultra Wideband (UWB), ZigBee and other protocols) may also be supported. The digital frame may also include an infrared component 365 that enables communication over an infrared spectrum (e.g., for communicating with a remote control that operates the digital frame 100). The digital frame 100 also includes a display component 360. In some embodiments, the display component 360 may comprise a touchscreen liquid crystal display. The display 360 displays content and may be touch-activated to provide varied functionality. In addition to displaying content, the touchscreen display 360 may display user interfaces (e.g. alphanumerical keyboard, buttons for selecting options, menus, etc.) that enable users to interact with the digital frame, either by using the touchscreen displays or by a remote. The digital frame 100 may also include other components, circuits, chips, etc. (not shown) that enable the digital frame 100 to provide the functionality described herein as well as additional functionality.

Figure 4A:
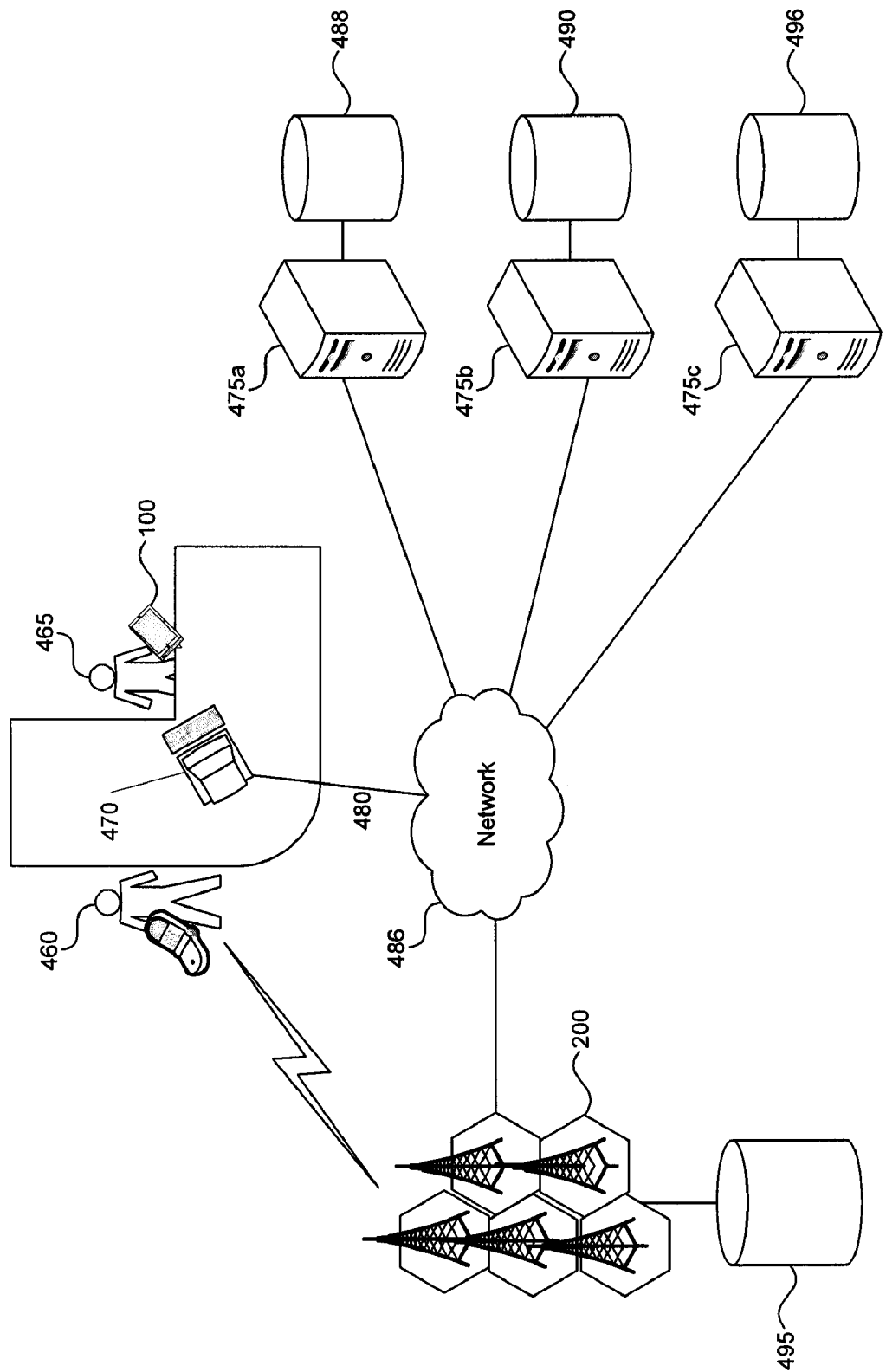
FIG. 4a is a perspective view of a sales station at which a digital frame may be purchased.

FIG. 4a is a perspective view of a sales station at which a digital frame 100 may be purchased. The sales station includes a point-of-sale terminal 470 that may be used by a sales agent 465 to sell a digital frame 100 to a purchaser 460. The point-of-sale terminal 470 has a network connection 480 over a public or private network 486 to one or more servers, such as a billing server 475a, an account server 475b, and a content management server 475c that are operated by a telecommunications service provider. Account server 475b is connected to an account data storage area 490, thereby enabling the point-of-sale terminal to access and modify subscriber account data maintained in the account data storage area by the telecommunications service provider. The account data stored in the account data storage area 490 includes any information associated with a subscriber such as: account number, name, billing address, mobile phone numbers, frame identifiers, service plans, billing information (e.g., credit or debit card or bank information), account expiration dates and date of birth. When a purchase of a digital frame is made, the point-of-sale terminal receives such information and conveys it to the account server 475b for storage in the account data storage area 490. The billing server 475a may be connected to a billing storage area 488 that is used by the telecommunications service provider to store data relating to the billing of subscriber accounts.

In addition to connections that enable the point-of-sale terminal to access account and billing services, the point-of-sale terminal may also be connected via a network connection to a content management server 475c that manages an online content repository storage area 496. The online content repository storage area 496 stores a collection of content buckets or online content repositories, each of which provides storage space for content that may be delivered to a customer's digital frame. Each of the online content repositories may be assigned an individual online content repository address (e.g., a URL or other unique address) to allow content to be sent to the customer and to allow the customer to access and/or modify his or her online content repository via the Internet or other network.

The billing server 475a, account server 475b, and content management server 475c may also be connected via a network connection to the telecommunications network 200 operated by the telecommunications service provider. The telecommunications network 200 may include one or more authorized user and/or service databases 495 which contain all or part of the information maintained by account data storage area 490, and/or additional information, and which are used by the telecommunications network 200 to validate and authorize telecommunications network services to the frame. The network connections connecting the servers and the telecommunications network may be wired, wireless or partially wired and wireless.

The point-of-sale terminal 470 at the sales station includes a processor, memory, input module, account management module, sales module and communication module. The input module permits the point-of-sale terminal 470 to receive personally-identifiable information about a purchaser 460 as part of the purchase of a digital frame. The input module may include one input device such as a keyboard, pointing device, touchscreen or similar, and at least one output device such as a monitor, speakers or similar to facilitate the receipt of information. The account management module enables the point-of-sale terminal 470 to access back-end services, such as billing services, offered by the telecommunications service provider, and to view, update or delete account data associated with the purchaser. For example, the account management module might enable a user of the point-of-sale terminal 470 to look up a service account using the purchaser's mobile phone number or social security number. The account management module may further enable the point-of-sale terminal 470 to establish a new service account by creating a new record in the account data storage area 490. The account management module also correlates the frame identifier of a purchased frame with the account of the purchaser. The sales module facilitates the sales transaction, such as by processing a credit card. Optionally, a content module may also facilitate the creation of a new online content repository in the online content repository storage area 496, and the assignment of an online content repository address to the newly created online content repository. The communication module enables the point-of-sale terminal 470 to communicate with the servers 475a, 475b and 475c. The point-of-sale terminal 470 may also include a network coverage module. The network coverage module allows a purchaser to determine whether wireless telecommunications coverage exists at the physical location that the digital frame is to be installed. If coverage does not exist at the location where the frame is to be installed, a purchaser may elect not to make the purchase.

The point-of-sale terminal 470 may primarily be used by a sales agent 465, or the point-of-sale terminal may be a self-service kiosk or other device that is operable by a purchaser 460. The functionality of the point-of-sale terminal may also be embodied as an interactive website accessible via the Internet or other public or private network. The various modules contained in the point-of-sale terminal are typically implemented as computer-readable instructions that are stored in the point-of-sale terminal memory and executed by the processor of the point-of-sale terminal.

Figure 4B:
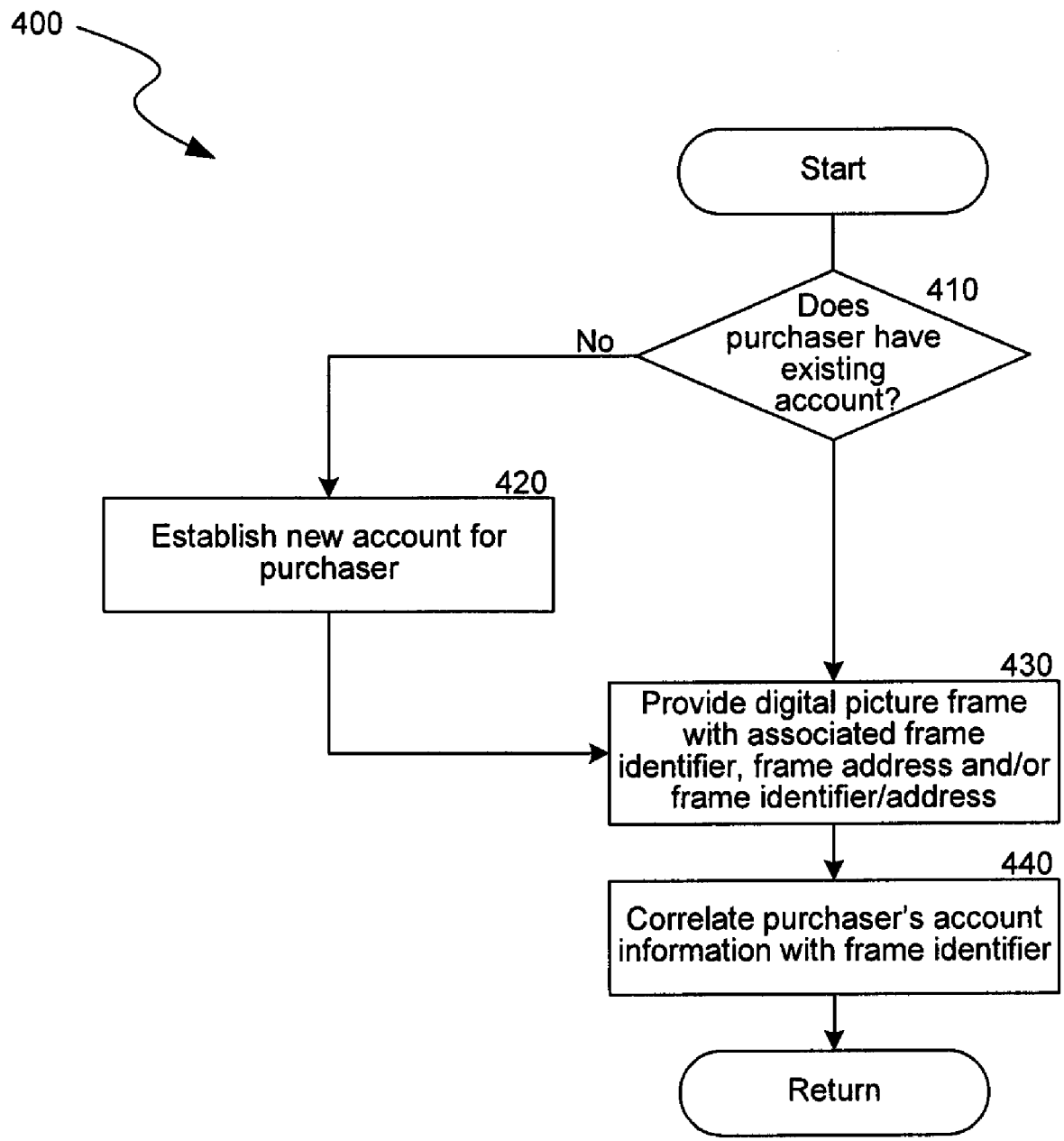
FIG. 4b is a flow chart of a process for deploying a digital frame that connects to a telecommunications network.

FIG. 4b is a flow chart of a process 400 for activating and provisioning a digital frame that receives content on a wireless telecommunications network. The process is implemented by a hardware and/or software system that is typically operated by the telecommunications service provider. The deployment process is initiated when a purchaser requests a digital frame 100 from a seller. The seller is a telecommunications service provider or a vendor affiliated with a telecommunications service provider. The purchaser may or may not be an existing subscriber of the telecommunications service provider. The purchaser may intend to keep the digital frame for his or her own use, or may plan to give or otherwise transfer the digital frame to another user who may or may not have an account with the telecommunications service provider. A human agent of the seller may operate a point of sale terminal to receive the request, or the request might be made through an automated system such as an interactive website (e.g., online store), or a self-serve sales kiosk.

When purchasing a digital frame 100, the purchaser may identify one or more locations where the digital frame might be installed. If the purchaser identifies an installation location, the seller may inform the purchaser as to whether the proposed installation location is covered by a telecommunications network 200 that is operated or otherwise usable by the telecommunications service provider. Based on the coverage of the network, the purchaser is therefore able to assess whether the frame will be able to operate over a wireless network at the desired location. At the time of the purchase, the purchaser may also be offered and may choose a data plan for the digital frame 100. For example, the purchaser may elect to prepay for a certain amount or period of data transmission to the digital frame 100. Alternatively, the purchaser may agree to be responsible for a recurring charge (e.g., a monthly recurring charge or MRC) on their telecommunications service account for either an unlimited or limited amount of data transfer during a billing period.

At a block 410, the system determines whether the purchaser has an existing account with the telecommunications service provider. If the purchaser does not have an existing account, at a block 420 the system facilitates the establishment of a new account for the purchaser. To do so, the purchaser may be asked to provide a social security number, credit or debit card information, bank account information, or any other similar information that would allow the purchaser be charged for future data delivery to the digital frame. When accessing an existing account of the purchaser, the seller may also determine if the purchaser has a mobile device (e.g., a mobile phone) associated with the account.

At a block 430, the seller provides the purchaser with a digital frame 100 having an associated frame identifier. Alternatively, the purchaser may have acquired a digital frame from a third-party vendor that does not provide content delivery service. A frame address, such as an SMS/MMS, ftp, email, website or other unique type of address, is also assigned to the frame by the seller. In some embodiments, the frame identifier (e.g., an IMSI) and the frame address may be identical, thereby permitting the seller to provide a single unified frame address and frame identifier. During or after the purchaser process, the purchaser may choose a nickname to assign to the frame (e.g., "Mom's Frame" for a frame that the purchaser plans to give to his mother). At a block 440, the frame identifier is correlated with the purchaser's telecommunications service account, as will be described in greater detail herein. The purchaser's chosen data plan, frame address, nickname or other relevant information may also be correlated to the purchaser's service account. Optionally, the system may also create a new online content repository for the frame and assign an online content repository address to the newly created online content repository.

Figure 5:
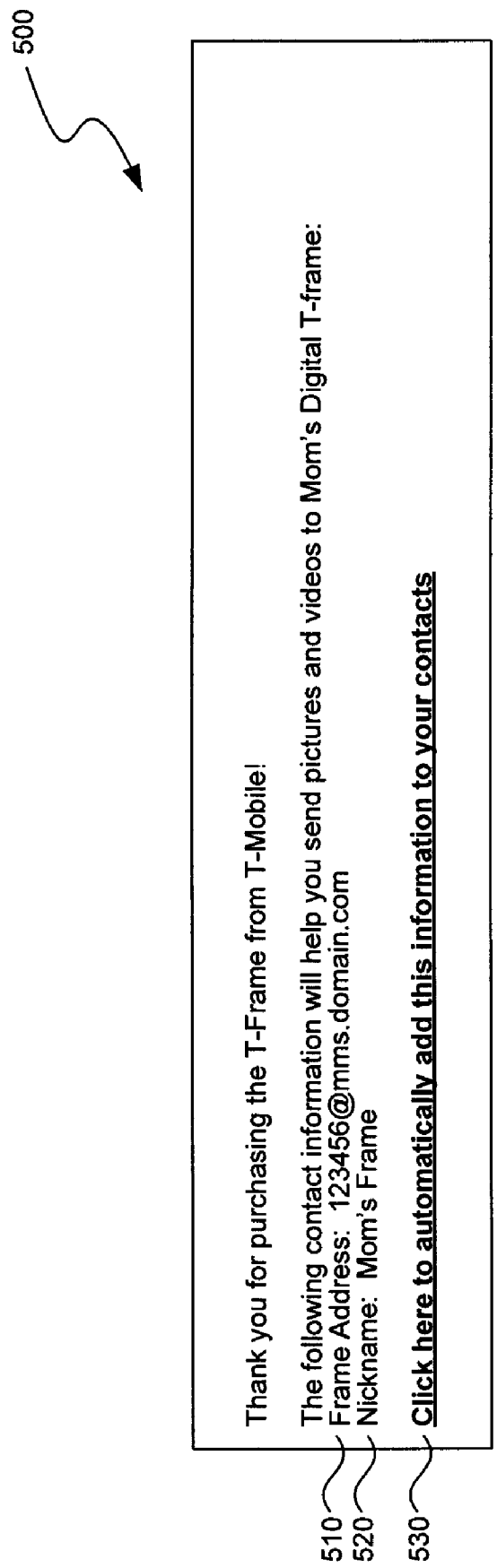
FIG. 5 depicts an example electronic message that may be sent to a purchaser of a digital frame or other recipient.

The purchaser or another recipient may be provided with address information regarding how to send photos or other content to the digital frame. The frame address may be provided by sending an electronic message to the purchaser's mobile device using the telecommunications network 200; to do so, the message may be sent to an electronic notice address associated with the mobile device (e.g., an SMS address, MMS address or mobile phone number). Alternatively, an electronic message may be sent to another type of electronic notice address associated with the purchaser, such as a personal email address provided by the purchaser. FIG. 5 shows an example of an electronic message 500 that may be sent to a purchaser of a digital frame or other recipient. As shown in FIG. 5, the electronic message 500 may include the frame address 510 and the frame nickname 520. Additionally, the electronic message 500 may include an executable object or control 530, such as a hyperlink, that when selected automatically stores the received frame address at the recipient's electronic device (e.g., a handheld mobile device). For example, the frame address may be stored in the recipient's contact list or it may be added to the recipient's photo application. The electronic message 500 might be delivered to the recipient via SMS/MMS, email or any other suitable delivery channel.

Once the frame address has been provided to a purchaser or other recipient, the purchaser or other recipient may easily send content, including photos, to the frame. For example, if a purchaser buys a frame to give to his mother, the purchaser and his siblings might send content-rich messages (e.g., via MMS or email protocols) to the frame. The associated content may be stored by the telecommunications service provider or its affiliates at a remote location (e.g., a remote server) at least until it can be sent to the mother's digital frame. Because the frame and network are typically always operational, however, it is possible to deliver the content to the frame very shortly after the content was transmitted by the sender.

FIG. 6 is a representative data table 600 that stores frame identifiers and other data pertaining to digital frames. Each row 605 in the table corresponds to a digital frame. Each column in the table provides identifying information about the frame, as well as associates the frame with a service account of a purchaser. A first column 610 in the table contains a frame identifier that is associated with a frame. The frame identifier may be assigned by the manufacturer of the frame, or the frame identifier may be assigned by the service provider. A second column 615 of the table contains a frame address that allows a user to send content to the frame. The frame address is typically assigned by the service provider. In some embodiments, the frame identifier and the frame address may be identical, in which case columns 610 and 620 may be consolidated into a single column (not shown). A third column 620 of the table contains a nickname that a purchaser may have assigned to the frame. A fourth column 625 of the table contains an indication of the frame model. By referencing a database containing frame information (not shown), the frame model provides the service provider with information about the capabilities of the frame, such as storage limitations, the type of content the frame can receive and display, the processing power of the frame, etc. A fifth column 630 of the table contains a service plan that is associated with the frame. For example, the frame may be allowed to receive an unlimited amount of data over the service provider's telecommunication network, or the frame may be capped at a certain amount of data each billing period. As another example, the purchaser may be billed a small amount each time that content is sent to the frame in order to cover the network costs associated with delivering the content. A sixth column 635 of the table contains an indication of the service account that is associated with the frame. The purchaser's service account is the initial account that is typically responsible for amounts that are charged under the frame service plan. Other data (not shown) might also be associated with each frame, such as a service tag number, date of purchase, record of customer service inquiries and resolutions, installed location of the frame, etc.

Using the data reflected in table 600, the telecommunications service provider or its affiliates can determine whether and how to route content to a particular digital frame, and how to bill for such services. For example, using the frame model, the service provider may determine the format of content that is to be forwarded or sent to a digital frame. As another example, by examining the purchaser's service account, the service provider may determine whether to send content to the digital frame, based on whether the purchaser's account is in good standing or whether it has expired. As another example, by accessing the purchaser's account number and the plan type, the service provider may determine whether and how to bill the purchaser for data sent to the digital frame.

While FIG. 6 depicts a table whose contents and organization are designed to make them more comprehensible by a human reader, those skilled in the art will appreciate that actual data structures used by the facility to store information may differ from the table shown, in that they, for example, may be organized in a different manner; may contain more or less information than shown; may be compressed and/or encrypted; etc.

Figure 7:
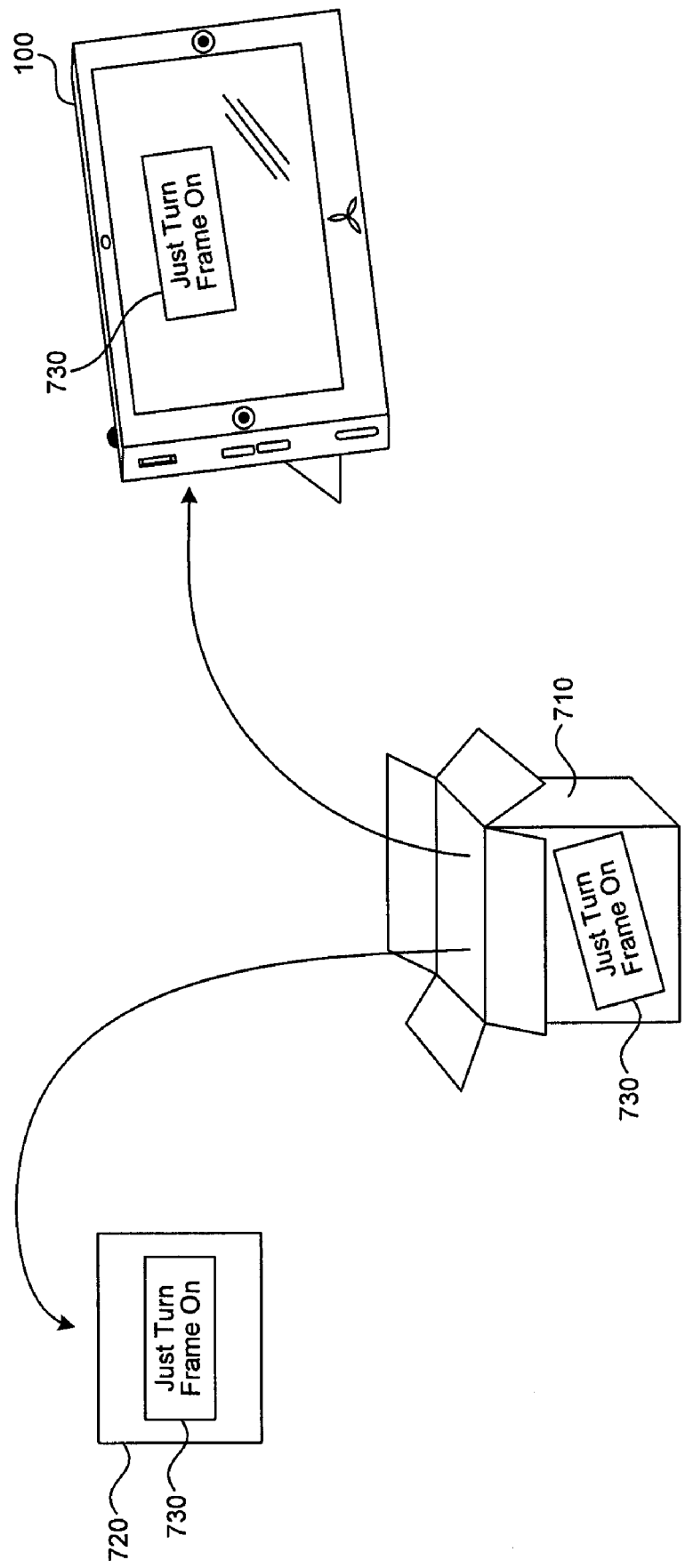
FIG. 7 is a perspective view depicting the removal of a digital frame from sales packaging.

FIG. 7 illustrates how messaging may facilitate an end user's installation and use of a digital frame. As shown in FIG. 7, once the end user receives a digital frame from a seller, a purchaser, or another intermediary, the end user may unpack the digital frame 100 from its packaging 710. The end user may also receive other accompanying materials 720, such as a user manual or other printed material or a CD-ROM or other digital media. As will be described in greater detail in relation to FIG. 8, installing and using the digital frame at a display location requires little or no technical knowledge by the end user. The digital frame requires only that the end user plug the digital frame into an outlet and turn on the frame. The digital frame automatically connects to an appropriate wireless telecommunications network and begins receiving content that is sent to the frame. To reinforce the ease of installation, messaging 730 may be provided upon the product packaging 710, the digital frame 100, or the materials 720 that accompany the digital frame. The messaging encourages the end user to simply turn on the digital frame. For example, as shown in FIG. 7, the messaging 730 might state "Just Turn Frame On."

To further enhance the end user's experience with the digital frame 100, an automated product demonstration may be automatically displayed on the digital frame when the digital frame is initially installed, whenever the digital frame is powered on, when the user provides certain input to the digital frame, or at other convenient times. To do so, the frame's processor 350 may execute computer-readable instructions that implement a product demonstration and may access content that depicts various features or capabilities of the digital frame. The computer-readable instructions or content relating to the product demonstration may have been preinstalled in the storage medium 335, or they may be sent over the telecommunications network 200 by the seller, by the telecommunications service provider, or by their affiliates after installation. In this way, the end user may gain more familiarity with the functionalities provided by the digital frame 100 without having to open and read instruction manuals or other documentation that may be shipped with the frame.

Figure 8:
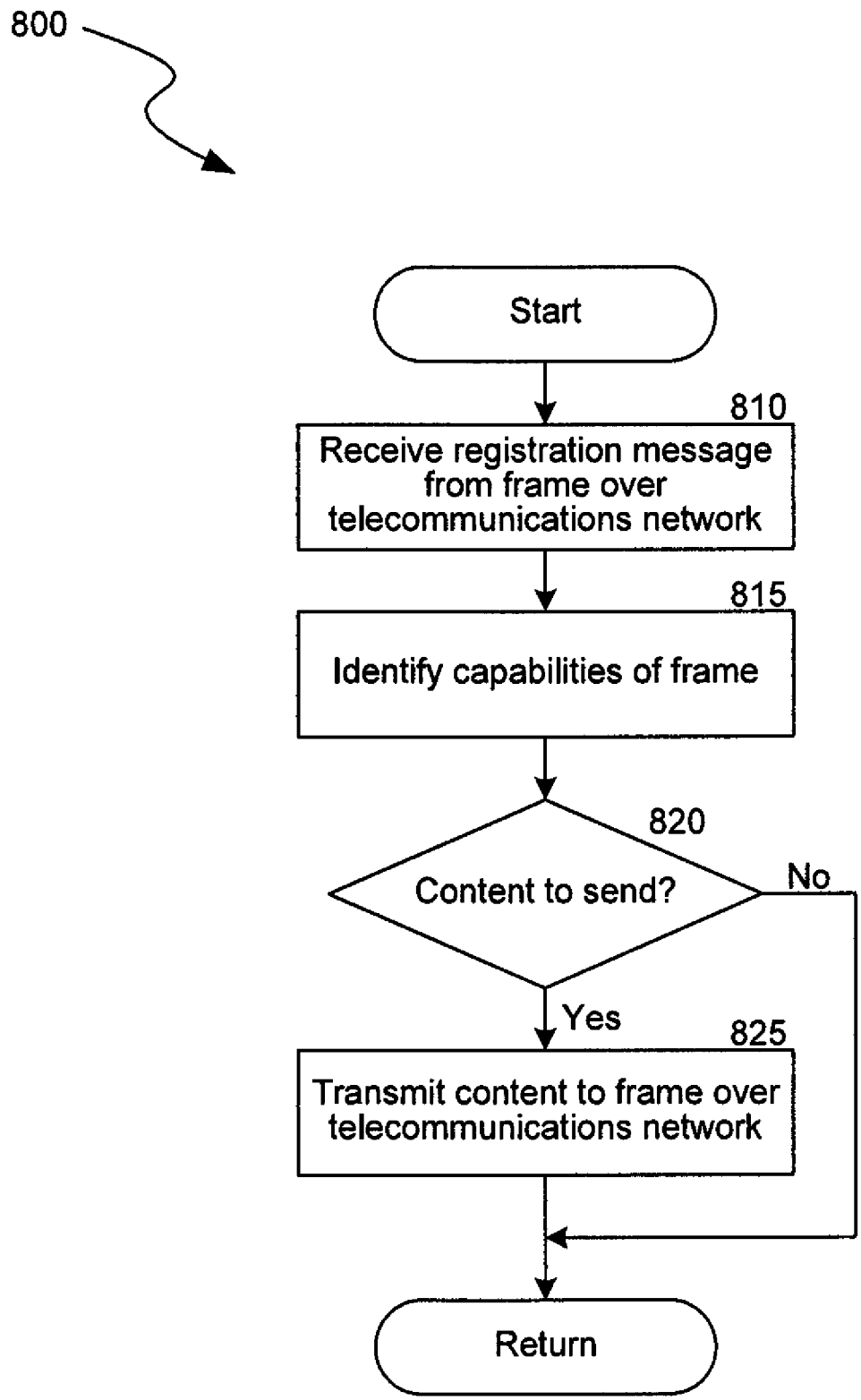
FIG. 8 is a flow chart of a process for providing content to the digital frame.

FIG. 8 is a flow chart of a process 800 for providing content to the digital frame. The process is implemented by a hardware and/or software system that is typically operated by the telecommunications service provider. Once a user has turned on the digital frame 100 at an installation location, the frame's communication component 325a will automatically attempt to initiate communication with a wireless telecommunications network. The attempt to establish communication involves sending a registration message to the service provider over the network. The registration message includes the stored frame identifier to allow the telecommunications service provider to identify the frame. At a block 810, the registration message is received by the system. At a block 815, the system accesses data that is stored in table 600 and associated with the received frame identifier, which data may reside on a telecommunication service provider's network database 495. The accessed data provides sufficient information about the frame to allow the system to determine the type, amount, and format of content that may be sent to the frame. The accessed data also allows the system to confirm that the subscription for the frame is current. At a block 820, the system determines whether any content has been queued for delivery to the frame. If content has been queued for delivery, at a block 825 the system transmits content to the digital frame over the telecommunications network. Once received by the digital frame 100, the content may be stored for subsequent presentation or immediately displayed. In this manner, an end user may be presented with content, such as photos, simply by turning on the digital frame and with little or no required initialization. During normal operation, content may be sent by the system to the digital frame on a continuous or periodic basis.

Once installed, the end user may receive assistance regarding the operation of the digital frame, even if the end user does not have an account with the telecommunications service provider. As described herein, the digital frame 100 may have messaging 170 that lists the frame identifier (or a similar identifier such as a service tag number) and contact information for accessing customer support services. For example, the contact information might be a telephone number, an email address, or a website. In some embodiments, the frame identifier or other identifier or the contact information may be presented upon the display. For example, in the event that the processor detects a system or network error, details of the system or network error may be automatically presented on the display. Using the contact information, the end user may contact the customer support entity associated with the telecommunications service provider or its affiliates. Since the end user may readily ascertain the frame identifier from the messaging 170 or the display 360, it is unnecessary for the end user to provide a service account number in order to receive customer service. Customer support personnel or systems may readily access some or all information relating to the end user's digital frame simply by utilizing the frame identifier (or a correlated identifier such as a service tag number). For example, by using the frame model correlated to the frame identifier, a customer service representative might be able to offer customized troubleshooting advice to the end user.

Figure 9:
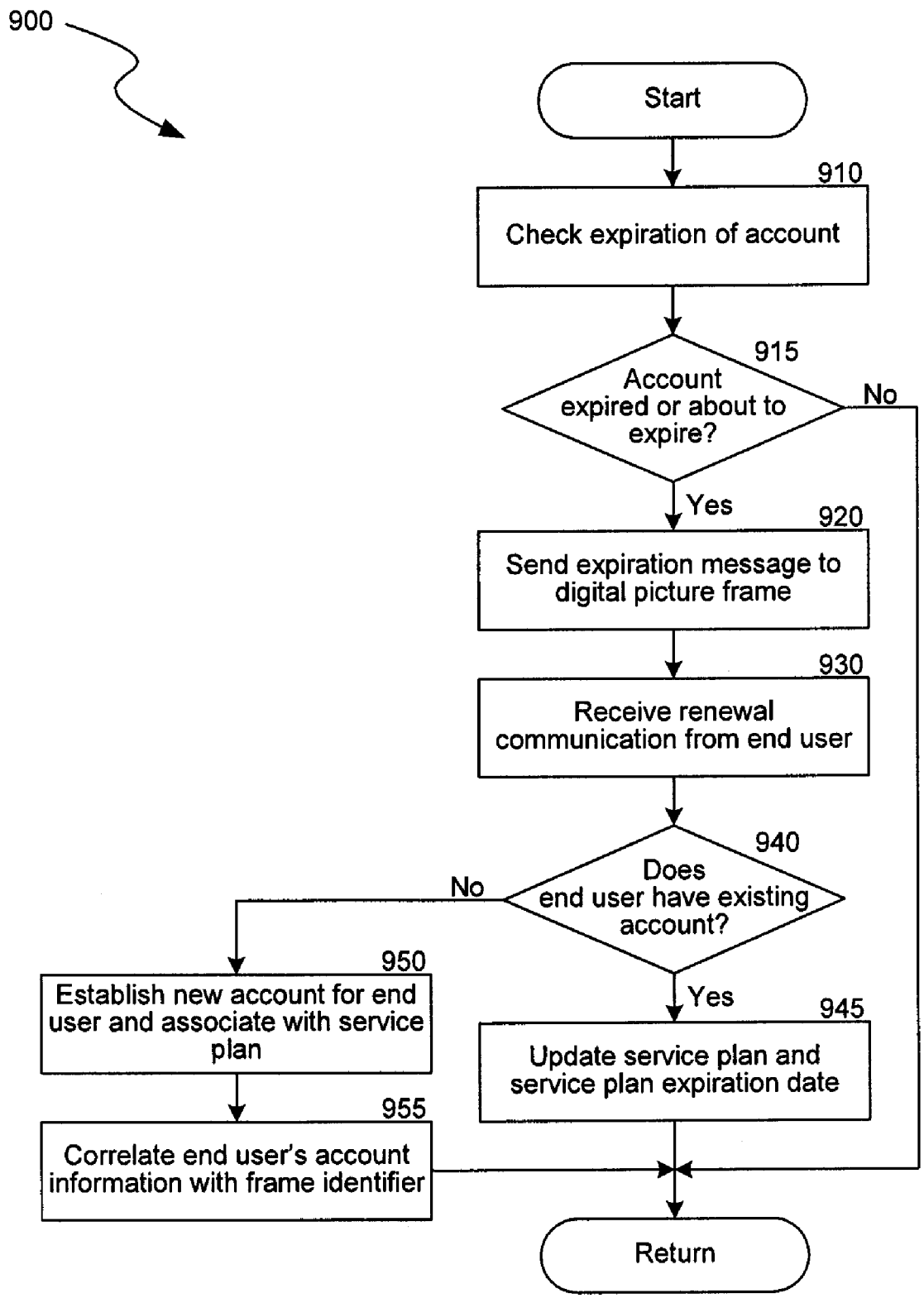
FIG. 9 is a flow chart of a process for managing the expiration of an account associated with a digital frame.

FIG. 9 shows a flow diagram of a process 900 for managing the expiration of an account associated with a digital frame. The process is implemented by a hardware and/or software system that is typically operated by the telecommunications service provider. At a block 910, the system accesses data that is stored in table 600 and associated with a frame identifier in order to assess whether the account of the frame has expired or is about to expire. For example, in the case of a pre-paid unlimited data plan, the system may determine if the data plan is scheduled to expire within the next month. As another example, in the case of data plan that provides for a fixed amount of data transfer, the system may determine if a certain percentage (e.g., 90%) of the fixed amount has already been used. At a block 915, the system determines whether the account has expired or is about to expire. If the account has not expired or is not about to expire, processing ends. If, however, the account has expired or is about to expire, processing continues to a block 920. At block 920, the system sends one or more messages to the digital frame over the wireless telecommunications network. A message may contain text, sound or image content that encourages or instructs the end user to contact the telecommunications service provider or its affiliates to ensure continued service on an existing account or to establish a new account. For example, the message might instruct the end user to call a customer service telephone number, access a particular website or initiate an interactive communication using the input and output components of the digital frame. Once received by the digital frame, the expiration message may be visually presented to the end user on the display or aurally presented to the end user over the audio outputs of the frame. The end user may be given an option to prevent, postpone or change the frequency of the presentation of the expiration message. When the account has expired, the message may also contain computer readable instructions that cause the digital frame to cease displaying content or to display content in a less than optimal fashion (e.g., to display the content at a lower resolution or with an adjusted color palette). A user would therefore be required to renew their account before the frame would return to normal operation.

In response to the expiration message or messages to a user, the user may send a renewal message to the system or provide a renewal communication to the service provider. At a block 930, the system receives a communication indicating that the end user wishes to continue receiving service. At a block 940, the system determines if the end user already has an existing account with the service provider. If the end user already has an existing account with the service provider, at a block 945 the system updates the service plan (if the end user indicated a desire for a different service plan) with the expiration date of the service plan. If the end user does not already have an account with the service provider, at a block 950 a new account for the end user is established by the system. In order to establish a new account, the end user may be required to submit contact information (e.g., address, phone number, email address) as well as payment information (e.g., a credit card). The end user may also select a particular service plan for the digital frame. At a block 955, the system then correlates the end user's account information with the frame identifier. Processing then halts.

It will be appreciated from the foregoing that the disclosed apparatuses and methods enable the seamless deployment of a digital frame and the timely delivery of content via a wireless telecommunications network. The digital frame may be provided to end users who have no affiliation with a telecommunications service provider or who have little technical expertise. The following example demonstrates how these apparatuses and methods might provide such benefits. In the example, a telecommunications service provider may sell a digital frame to a purchaser ("Son") who already has a mobile phone account with the service provider that is in good standing. Son requests that the service provider bill him monthly for unlimited data delivery to the frame for the first twelve months after the purchase and chooses a nickname for the frame. Son receives an MMS message on his mobile phone from the service provider that lists the frame address and nickname for the new digital frame, and a hyperlink to add the frame address and nickname to his mobile phone. Son may click on the hyperlink and forward the MMS message to his siblings. Son and his siblings then use their mobile phones and personal email accounts to send family photos and videos to the frame address. They also upload photos and videos to a website that is also associated with the frame address and maintained by the service provider. Shortly after buying the digital frame, the Son gives the frame to his mother ("Mother") as a gift. The Mother has little technical literacy and does not feel comfortable using new technologies. However, after unwrapping the digital frame, she feels encouraged by the messaging on the frame and turns it on. The frame automatically receives the photos and videos sent by Son and his siblings within a few minutes. While receiving content, the frame automatically displays a product demonstration that provides Mother with an overview of how the frame operates and how she might adjust the frame to her liking. Once the content is received and the product demonstration is completed, the frame automatically begins displaying the pictures and videos. Thereafter, whenever Son or his siblings send new content to the frame identifier, the frame automatically received and displays the new content. A month after installing the frame, Mother uses the contact information and frame identifier provided on the frame to ask a customer support representative how she might adjust the volume of the frame's audio speakers. Eleven months after the purchase, the frame begins intermittently displaying a message that states: "The prepaid account for this frame is slated to expire soon. You can renew service within minutes, even if you do not already have an account with us. Please contact us at 555-555-5555 to ensure uninterrupted delivery and display of your photos." Mother ignores this message and twelve months after purchase, the frame stops downloading new photos and videos, and begins regularly displaying a message that reads: "The prepaid account for this frame has expired. Until a new account is established, you will not be able to receive any new photos or videos. You may renew service within minutes, even if you do not have an account with us.

Please contact us at 555-555-5555 to resume immediate delivery and display of your new photos and videos." Impatient to receive photos of her recently-born grandchild, Mother eventually calls the displayed phone number, and provides the call center with the frame identifier that appears upon the frame. She also provides her credit card information and authorizes the service provider to bill her monthly over the next year. Within minutes of authorizing service, her frame automatically downloads and displays new photos and videos of her newest grandchild.

From the foregoing, it will be appreciated that specific embodiments of the invention have been described herein for purposes of illustration, but that various modifications may be made without deviating from the spirit and scope of the invention. Those skilled in the art will appreciate that the steps shown in FIGS. 4b, 8, and 9 may be altered in a variety of ways. For example, the order of the steps may be rearranged; substeps may be performed in parallel; shown steps may be omitted, or other steps may be included; etc. Accordingly, the invention is not limited except as by the appended claims.

I claim:

1. A method in a computing system of deploying a digital frame that receives content via a wireless telecommunications network, the method comprising:
   receiving from a purchaser a request to purchase a digital frame and personally-identifiable information about the purchaser;
   using, by a processor of computing system, the received personally-identifiable information to identify an account that the purchaser has with a wireless telecommunications service provider and to open an account for the purchaser when the purchaser does not have a pre-existing account with a wireless telecommunications service provider;
   identifying by the processor of the computing system, an electronic notice address associated with the purchaser;
   creating, by processor of the computing system, an association between the purchaser and a digital frame having a frame identifier and a frame address by:
      storing the frame identifier in association with the account of the purchaser; and
      transmitting the frame address to the electronic notice address associated with the purchaser; and
   causing, by the processor of the computing system, the provisioning of wireless telecommunications services to the digital frame under the wireless telecommunications service account of the purchaser.

2. The method of claim 1, wherein the frame address is transmitted via an email message sent to an electronic notice address associated with a mobile device.

3. The method of claim 2, wherein the email message includes a control to store the frame address on the mobile device.

4. The method of claim 1, wherein the frame address is transmitted via an SMS message.

5. The method of claim 1, further comprising confirming the availability of the wireless telecommunications network at a proposed installation location of the digital frame.

6. The method of claim 1, wherein the personally-identifiable information is a mobile phone number of the purchaser.

7. The method of claim 1, wherein the frame identifier and the frame address are identical.

8. The method of claim 1, further comprising provisioning a content repository to store content that is for delivery to the digital frame.

9. A system for selling digital frames that receive content via a wireless telecommunications network, the system comprising:
   one or more storage areas containing instructions; and
   one or more processors that execute the stored instructions to generate:
      an input module to receive a request by a purchaser to purchase a digital frame having a frame identifier and frame address, the input module additionally receiving personally-identifiable information about the purchaser;
      an account management module to identify an account that the purchaser has with a telecommunications service provider and to open an account for the purchaser when the purchaser does not have a pre-existing account with a wireless telecommunications service provider, identify an electronic notice address associated with the account of the purchaser, store the frame identifier of the digital frame in association with the account of the purchaser, and provision wireless telecommunications services to the digital frame under the wireless telecommunications service account of the customer;
      a sales module to transact a sale of the digital frame to the purchaser; and
      a communication module for transmitting the frame address to the electronic notice address associated with the account of the purchaser.

10. The system of claim 9, wherein the frame address is transmitted via an email message to the electronic notice address.

11. The system of claim 10, wherein the email message includes a control to store the frame address on a mobile device that receives the email message.

12. The system of claim 9, wherein the frame address is transmitted via an SMS message.

13. The system of claim 9, further comprising a network coverage module for determining the availability of a telecommunications network at a proposed installation location of the digital frame.

14. The system of claim 9, wherein the account management module identifies the account of the purchaser based on a mobile phone number of the purchaser.

15. The system of claim 9, wherein the frame identifier and the frame address are identical.

16. The system of claim 9, further comprising a content module to provision a content repository and assign a content repository address to the content repository.

17. A method in a computing system of provisioning wireless telecommunications services for a digital frame, the method comprising:
   receiving, by a processor of the computing system, a service request for a digital frame from a customer, the service request comprising a frame identifier associated with the digital frame and personally-identifiable information associated with the customer;
   identifying, by a processor of the computing system, a wireless telecommunications service account of the customer using the received personally-identifiable information;
   assigning, by a processor of the computing system, a frame address to the digital frame;
   assigning, by a processor of the computing system, an on-line content repository address to the digital frame, the on-line content repository address associated with an on-line content repository that stores content for delivery to the digital frame;

storing, by a processor of the computing system, the frame address and the on-line content repository address in association with the wireless telecommunications service account of the customer; and causing, by a processor of the computing system, the provisioning of wireless telecommunication services under the wireless telecommunications service account of the customer to enable content to be transmitted from the on-line content repository associated with the digital frame to the digital frame at the frame address via a wireless telecommunications network.

18. The method of claim 17, further comprising transmitting the frame address to an electronic notice address associated with the customer.

19. The method of claim 18, wherein the electronic notice address is an email address and the frame address is transmitted via an email message.

20. The method of claim 19, wherein the email message includes a control to store the frame address on a device that receives the email message.

21. The method of claim 18, wherein the electronic notice address is an SMS address and the frame address is transmitted via an SMS message.

22. The method of claim 17, further comprising confirming the availability of the wireless telecommunications network at a proposed installation location of the digital frame.

23. The method of claim 17, wherein the personally-identifiable customer information is a mobile phone number.

24. The method of claim 17, wherein the frame identifier and the frame address are identical.

* * * * *